Feb. 19, 1929.
Y. B. F. J. GROENEVELD
1,702,771
AMPLIFYING TRANSFORMER
Filed May 18, 1927
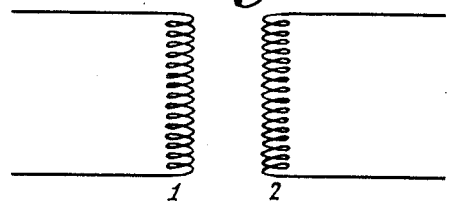
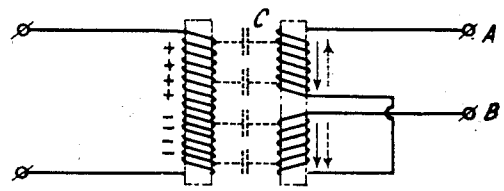
INVENTOR
YME BOUWINUS FOLKERT JAN GROENEVELD
BY
ATTORNEY Patented Feb. 19, 1929.

1,702,771

UNITED STATES PATENT OFFICE.

YME BOUWINUS FOLKERT JAN GROENEVELD, OF EINDHOVEN, NETHERLANDS, ASSIGNOR TO RADIO CORPORATION OF AMERICA, A CORPORATION OF DELAWARE.

AMPLIFYING TRANSFORMER.

Application filed May 18, 1927, Serial No. 192,216, and in the Netherlands May 14, 1926.

The object of this invention is to reduce the capacitive effects in transformers adapted to be used for amplifying high or low frequency alternating currents.

In such transformers a high ratio of transformation should be endeavoured to be obtained. This high ratio of transformation can be secured:

Firstly by a high ratio of turns,

Secondly by a close coupling of the turns.

In the case of a close coupling of the primary and the secondary coils the capacity between the two coils becomes important. This natural capacity of the transformer may be decreased by winding the turns, one of which surrounds the other, in a well known manner, for example by winding the coils on a conical surface so that the turns recede gradually from each other as the potential difference between them increases. This method however only reduces the currents produced by capacitive transmission to a small degree, and does not neutralize them.

In the invention the capacity currents are neutralized by subdividing one of the coils into sections which are wound so that capacity effects are mutually opposed.

Figure 1 represents schematically a transformer of the well known type. Figure 2 shows schematically a transformer of my invention.

The invention will be more clearly understood by reference to the accompanying drawings. In practice the primary and secondary windings of each transformer are wound on the same axis, but in these figures these windings are shown separated from each other to more clearly illustrate the invention. A magnetic core may be utilized and is usually desirable in low frequency transformers, as is well known. Referring to Fig. 1, electromotive forces are induced in coil 2 as a result of the magnetic field and electric field of coil 1. These electromotive forces may assist or counteract each other so that the amplification characteristic of the transformer may be influenced thereby. The action of the electric field of coil 1 on coil 2 and conversely may be neutralized if one of the two coils is wound in two or more sections and if the direction in which the sections are wound results in the mutual opposition of the capacitive effects of the electric field in each coil.

Figure 2 shows a circuit arrangement in which the secondary is divided into two sections. The mutual capacity of the turns is diagrammatically represented in the figure by dotted condensers. The electromotive forces produced by the capacitive coupling are indicated by dotted arrows. If now the entire secondary is traversed from the terminal A to the terminal B the said capacitive forces are found to neutralize each other so that the production of a potential difference between the terminals A—B is prevented by capacitive transmission. This is shown in Fig. 2, wherein the dotted arrows show the direction of the capacitive currents, which depend on the direction of the axis of the winding. The induced electromotive forces, or those caused by the electromagnetic linkage, depend on the rotary direction of the winding; since this rotary direction is the same in both sections of the secondary, the direction of the induced current will be in the same direction, as is shown by the solid arrows in the figure.

It will be seen from Figure 2 that the windings of the two sections of the secondary coil are in the same direction curvilinearly around the core, but that the advance of the convolutions of these windings are in opposite directions. The same curvilinear or rotary direction of the two sections results in an induced magnetic flux having the same polarity in each section. The polarity is ascertained by means of the right-hand rule. On the other hand, the capacitive fluxes in the sections have opposite polarity, due to the face that the advance of the convolutions of each section is toward each other. The capacitive effects of the transformer are therefore neutralized. If desired, more than two sections may be utilized.

It is obvious that each section of the secondary may comprise more than one layer. For example, each section may comprise a multi-layer winding, the essential condition being that the sections be so connected that the output end of one section is adjacent the input end of its adjoining section, as is shown in Figure 2.

What I claim is:

1. A transformer having primary and secondary coils, one of said coils comprising a plurality of axially facing sections, each section being wound in the same rotary direction but in an opposite axial direction relative to its adjoining section.

2. A transformer having primary and secondary coils, one of said coils comprising two axially facing sections, one section being wound in the same rotary but in the opposite axial direction relative to the other section, the adjacent end of one section being connected with the distant end of the other section.

3. A transformer having primary and secondary coils, one of said coils comprising a plurality of sections placed end to end, the axes of all sections being in alignment, each section being wound in the same rotary direction but in an opposite axial direction relative to its adjoining section.

YME BOUWINUS FOLKERT JAN GROENEVELD.